United States Patent [19]

Koshiyouji et al.

[11] Patent Number: 4,989,099
[45] Date of Patent: Jan. 29, 1991

[54] IMAGE INFORMATION READING APPARATUS

[75] Inventors: Takashi Koshiyouji, Yokohama; Hiroyuki Mori, Tokyo, both of Japan

[73] Assignee: Kabushiki Kaisha Toshiba, Kawasaki, Japan

[21] Appl. No.: 257,676

[22] Filed: Oct. 14, 1988

[30] Foreign Application Priority Data

Oct. 16, 1987 [JP] Japan ................................. 62-261194

[51] Int. Cl.⁵ ............................................. H04N 1/00
[52] U.S. Cl. .................................... 358/474; 358/487; 358/497
[58] Field of Search ................... 355/23; 358/293, 294, 358/285, 280, 296, 256, 287, 400, 408, 474, 475, 487, 494, 497, 401, 486

[56] References Cited

U.S. PATENT DOCUMENTS

| | | | |
|---|---|---|---|
| 4,486,786 | 12/1984 | Sato | 358/293 |
| 4,571,636 | 2/1986 | Itoh | 358/285 |
| 4,673,989 | 5/1987 | Yamada | 358/297 |
| 4,743,974 | 5/1988 | Lockwood | 355/23 |
| 4,879,604 | 11/1989 | Koshiyouji | 358/474 |
| 4,893,196 | 1/1990 | Koshiyouji et al. | 358/408 |

FOREIGN PATENT DOCUMENTS

| | | |
|---|---|---|
| 0010572 | 1/1982 | Japan ................................. 358/285 |
| 58-104561 | 6/1983 | Japan . |
| 58-111480 | 7/1983 | Japan . |
| 58-111481 | 7/1983 | Japan . |
| 60-16766 | 1/1985 | Japan . |
| 60-186827 | 9/1985 | Japan . |
| 0186827 | 9/1985 | Japan ................................. 355/23 |
| 0191281 | 9/1985 | Japan ................................. 355/23 |
| 63-246965 | 10/1988 | Japan . |
| 63-252063 | 10/1988 | Japan . |

Primary Examiner—Edward L. Coles, Sr.
Assistant Examiner—Jerome Grant, II
Attorney, Agent, or Firm—Finnegan, Henderson, Farabow, Garrett, and Dunner

[57] ABSTRACT

This image information reading apparatus has a main body and the main body has a platen glass provided on the top surface thereof. The main body includes a scanner having a lamp, a photoelectric transducer, an optical member, etc. When this image information reading apparatus is used for reading two types of original copies, one for reflected light and the other for transmitted light, a transmission unit for illuminating an original for transmitted light is mounted to the main body with first supporting means. This transmission unit serves as an original retainer when an original for reflected light is read. When this image information reading apparatus is used for reading only originals for reflected light, an original cover is mounted to the main body with second supporting means.

12 Claims, 5 Drawing Sheets

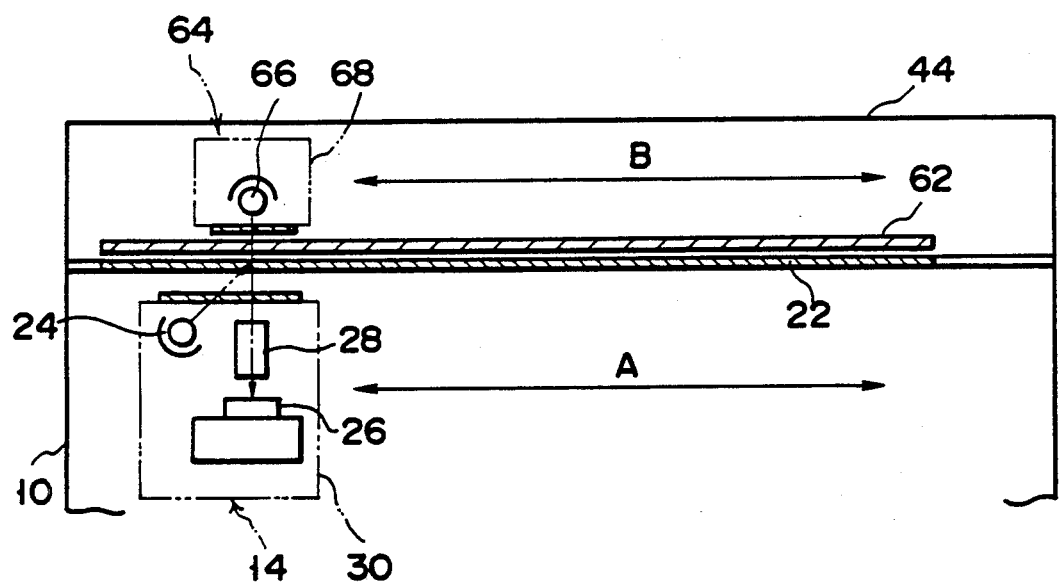
F I G. 3

IMAGE INFORMATION READING APPARATUS

BACKGROUND OF THE INVENTION

1. Field of the Invention

This invention relates to an image information reading apparatus which reads the original by utilizing the light that passes therethrough or is reflected thereby and which is used in the image scanner, printer, facsimile, etc.

2. Description of the Related Art

In the image information reading apparatus used in the image scanner, printer, facsimile, etc., an exposure light is projected onto the original placed on the original table and the transmitted light or the reflected light from the original is converted by the photoelectric transducer of the scanner into electric signals. In this way, desired image signals are input into the host computer. The scanner is driven by a well-known drive means to reciprocate over the original table. The control circuit built in the main body is used to control the above operation and the processing of signals.

Conventionally, the image information reading apparatuses are produced in two different types, one type for reading information from an original for reflected light and the other type for reading information from an original for transmitted light. Meanwhile, an image information reading apparatus has been developed which is capable of reading information both from originals for reflected light and transmitted light. In this type of apparatus, a scanner comprising a photoelectric transducer and a light source is installed in the main body fitted with a platen glass (original table). Provided outside the main body is a transmission unit, which has a light source section for projecting light onto an original for transmitted light mounted in a position opposed to the platen glass (U.S. application Ser. No. 50,012). The light source section of the transmission unit faces the scanner across the platen glass. When an original for transmitted light is read, the light source section of this transmission unit which is synchronized with the scanner is moved with the scanner at the same speed and in the same direction. Therefore, this reading apparatus requires a drive means to drive the scanner and another drive means to move the light source section in the transmission unit.

This reading apparatus is convenient indeed because it is capable of reading information both from originals for reflected light and transmitted light, but it carries with it a problem that the light source unit and the drive unit included in the transmission unit are lying idle when this reading apparatus is used only for reading original copies for reflected light.

SUMMARY OF THE INVENTION

The object of this invention is to provide an image information reading apparatus which can be fitted selectively with an original copy cover used only for reading information from originals for reflected light or a transmission unit used for reading information from originals for transmitted light.

According to an aspect of the present invention, there is provided an image information reading apparatus which comprises a main body; original supporting means for selectively supporting a first original which reflects light and a second original which light passes through; first lighting means provided in the main body and used to illuminate the first original supported by said original supporting means; second lighting means for illuminating the second original supported by said original supporting means; reading means located in the main body and having a function to read the image information of the first original by detecting the light reflected from the first original illuminated by said first lighting means and a function to read the image information of the second original by detecting the light that has passed through the second original illuminated by said second lighting means; means for covering the first original supported by said original supporting means; and means for selectively mounting said second lighting means and said covering means on said main body.

BRIEF DESCRIPTION OF THE DRAWINGS

FIG. 3 is a longitudinal section of a part of the image information reading apparatus of FIG. 1;

DETAILED DESCRIPTION OF THE PREFERRED EMBODIMENT

An embodiment of this invention will now be described in the following.

Figure 1:
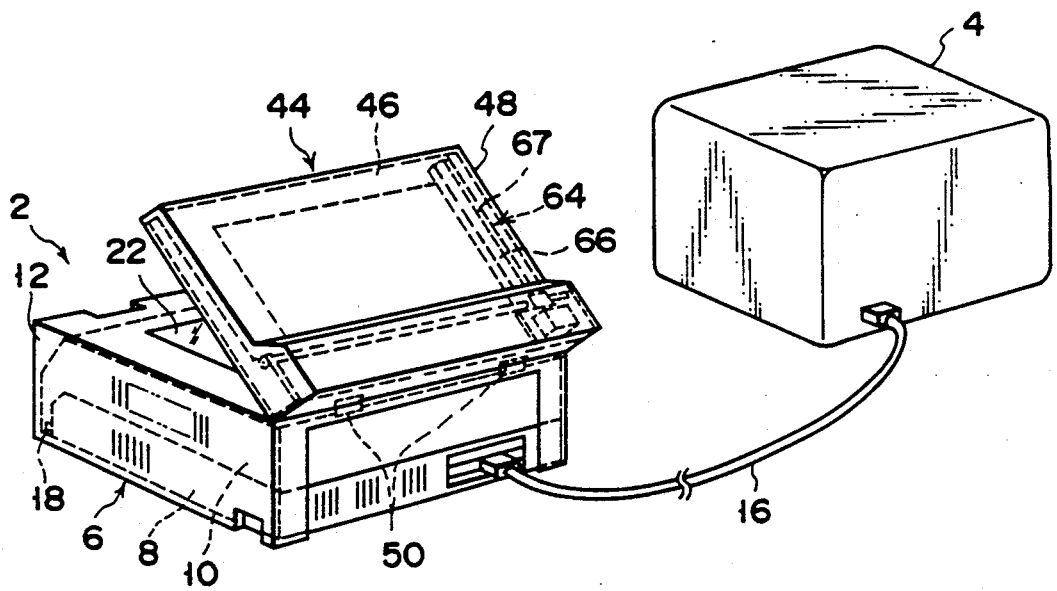
FIG. 1 is a perspective view showing an image information reading apparatus according to this invention and an external equipment connected thereto as seen from the rear side.
Figure 2:
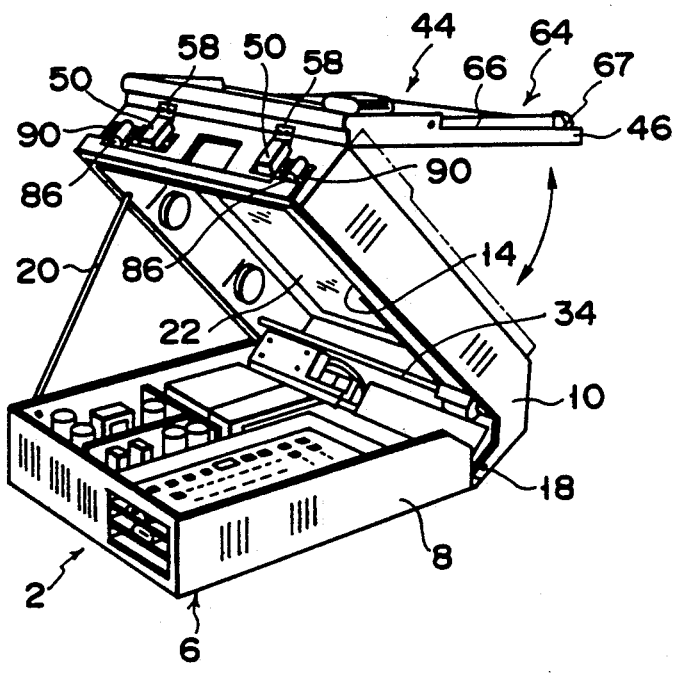
FIG. 2 is a perspective view of the opened state of the casing of the image information reading apparatus of FIG. 1.

Referring to FIG. 1, the numeral 2 indicates an image information reading apparatus (image scanner) for reading image information from originals for reflected light (ordinary originals) and original for transmitted light (positive and negative films, OHP sheets, etc.). The image information read by this reading apparatus 2 is supplied to external device 4 such as a host computer. This reading apparatus has main body 6, which comprises first casing 8, second casing 10 and detachable synthetic resin cover 12 which encloses the outside of casings 8 and 10. Further, main body 6 incorporates a power source section, not shown, a control circuit board and scanner 14 (FIG. 2). The circuit board includes circuits such as a GPIB interface board, a scanner processing board or a scanner image processing board, for example. This circuit board is connected to external device 4 through an interface connector and cable 16 for connection with an external device. External device 4 may be various types of computer, a printer or an electronic filing system, for example.

Referring to FIG. 2, pivots 18 are provided at one side (front end in the case illustrated) of first casing 8. Second casing 2 is supported by pivots 18 in such a manner that second casing 10 can be opened and closed in the vertical direction. FIG. 1 shows the closed state of second casing 10 and FIG. 2 shows the opened state of second casing 10, respectively. Second casing 10 can be held opened at an adequate opening angle by stopper 20.

Figure 4:
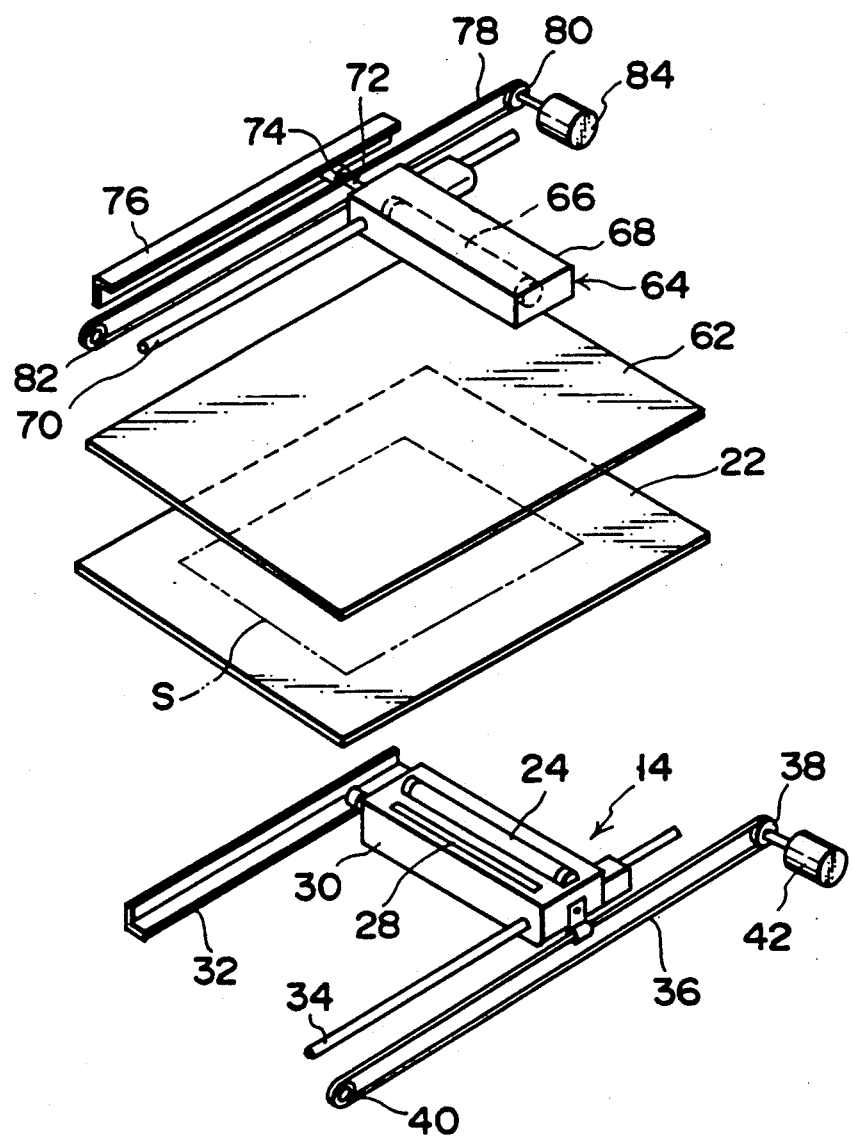
FIG. 4 is a perspective view showing a part of the image information reading apparatus of FIG. 1.

As shown in FIG. 3, platen glass 22 is mounted on the top surface of second casing 10 to place an original thereon. Scanner 14 is disposed on the reverse side of platen glass 22 such that scanner 14 can move in parallel with platen glass 22. Scanner 14 includes straight-pipe fluorescent lamp 24 to illuminate an original for reflected light, photoelectric transducer 26 such as a CCD line sensor to convert the light from the original into electric signals, optical member 28 such as a rod lens array to guide the light from the original to photoelectric transducer for image-formation and carriage 30 to support all those component parts. Carriage 30 has an amplifier board (not shown) incorporating an amplifier circuit to amplify signals output by photoelectric transducer 26. As shown in FIG. 4, scanner 14 is supported at both ends by guide 32 and rail shaft 34. A part of timing belt 36 is fixed to one end of scanner 14. Timing belt 36 is applied on driving-side sprocket 38 and driven-side sprocket 40. Driving-side sprocket 38 is driven by motor 42 fitted with a speed reducer. Thus, scanner 14 is made to reciprocate along guide 32 and rail shaft 34 and in the directions of the arrow A as indicated in FIG. 3.

As shown in FIG. 1, transmission unit 44 having an area sufficient to cover the whole surface of platen glass 22 is provided on the side of the top surface of main body 6. This transmission unit 44 is provided with metal chassis 46 in the form of a rectangular frame and synthetic resin cover 48 enclosing the outside of chassis 46. Transmission unit 44 is supported by a couple of first support members 50 such that transmission unit 44 can be moved up and down with respect to second casing 10. First support joints 50 are provided on the side opposite to pivots 18 of second casing 10, namely, on the rear side of second casing 20.

Figure 5:
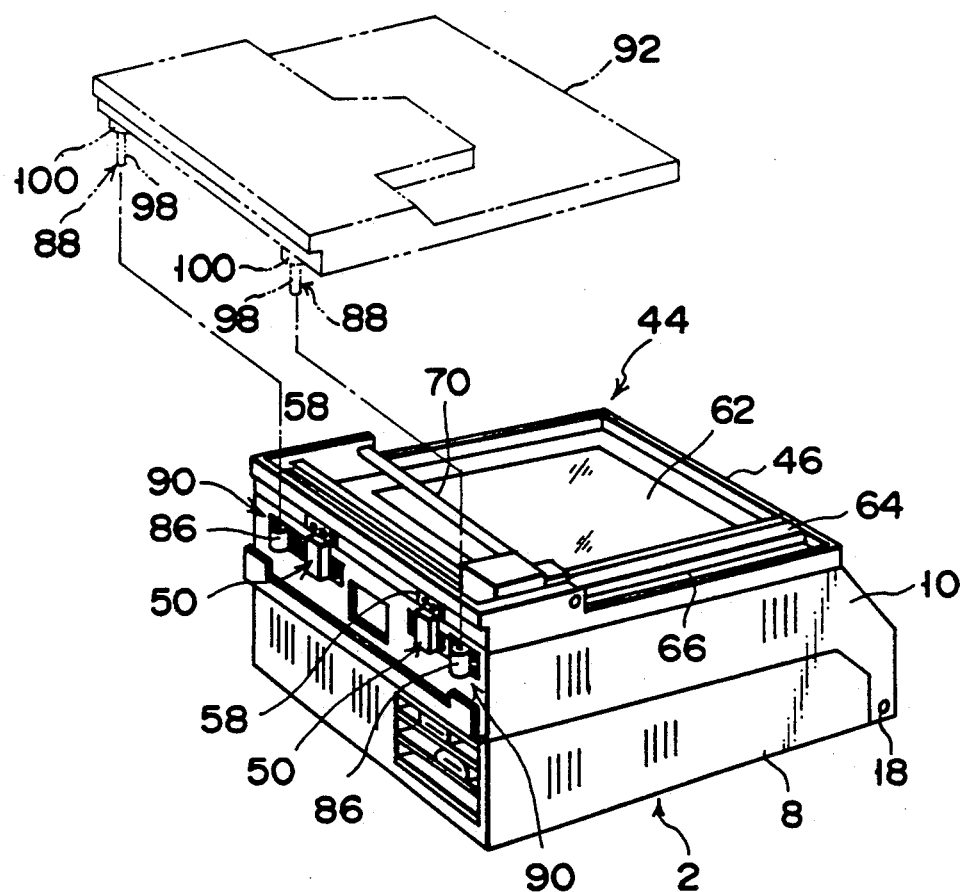
FIG. 5 is a perspective view showing the image information reading apparatus of FIG. 1, the cover of which is removed.
Figure 6:
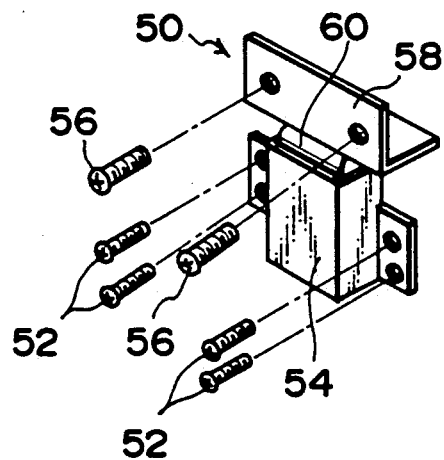
FIG. 6 is a perspective view showing the support joint for the transmission unit of the image information reading apparatus of FIG. 1.
Figures 7, 8, 9:
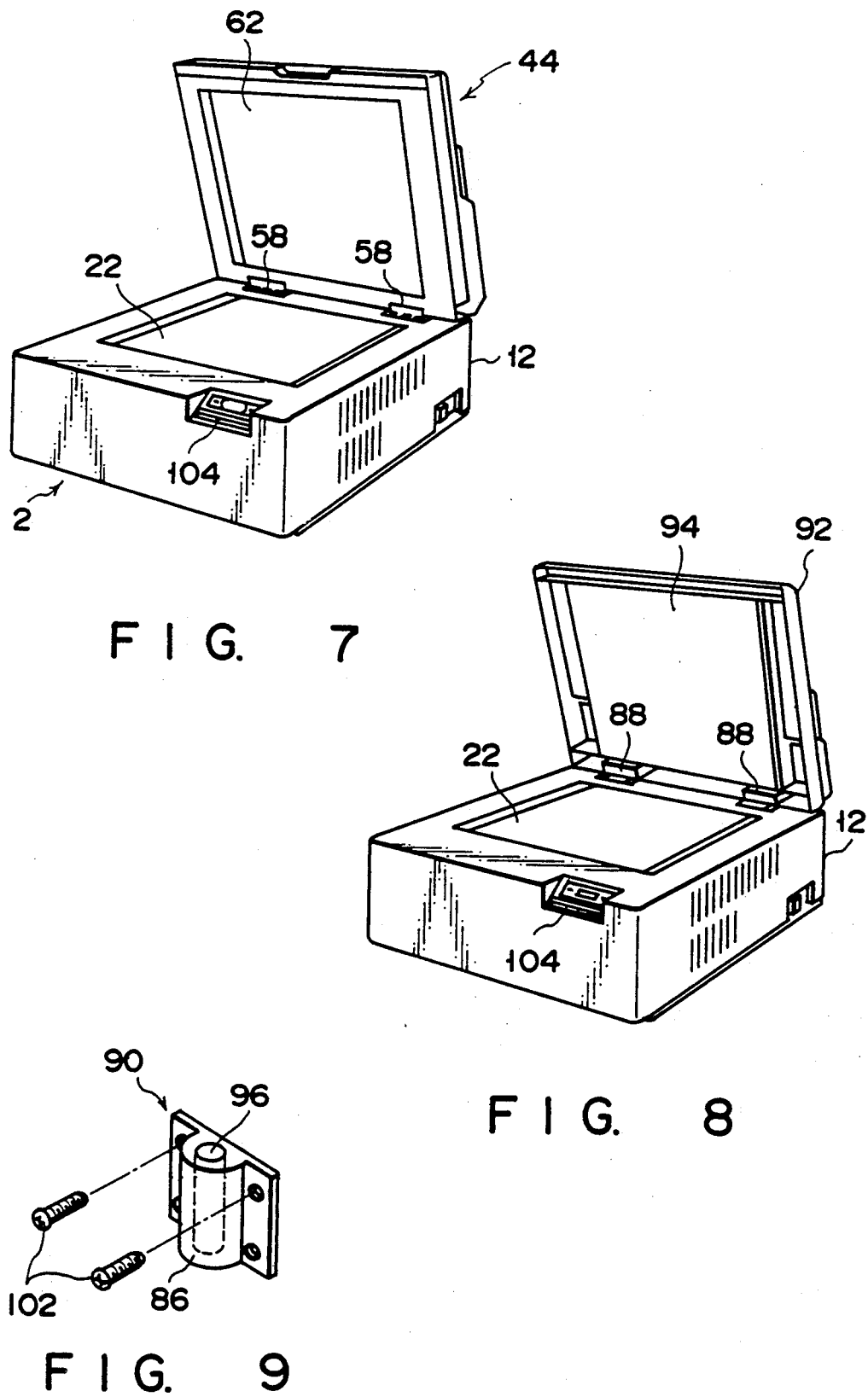
FIG. 7 is a perspective view showing the image information reading apparatus of FIG. 1, equipped with the transmission unit.
FIG. 8 is a perspective view showing the image information reading apparatus of FIG. 1, equipped with the original copy cover.
FIG. 9 is a perspective view showing the support section for the original copy cover of the image information reading apparatus of FIG. 1.

Referring to FIGS. 5 and 6, first support joints 50 each comprise fixed-side member 54 secured to second casing 10 with a plurality of screws 52, movable-side member 58 secured to chassis 46 of transmission unit 44 with a plurality of screws 56 and connecting member 60 which connects fixed-side member 54 and movable-side member 58 in such a manner as to allow movable-side member 58 to turn. Fixed-side members 54 and movable-side members 58 are rigidly made of metal since they support transmission unit 44 having a great weight. FIG. 7 shows an example in which transmission unit 44 is mounted to main body 6. By removing screws 52, transmission unit 44 can be dismounted from main body 6.

As is apparent from FIGS. 3 to 5, translucent plate 62 is provided on the bottom face side of transmission unit 44, that is, on the side opposite to platen glass 22. A plate which allows light to pass through or diffuse such as a white or milk-white resin panel is used for translucent plate 62. Light source unit 64 is provided at a position opposed to scanner 14 across translucent plate 62. This light source unit 64 comprises straight-pipe fluorescent lamp 66 to illuminate an original for transmitted light, lamp holder 67 to hold lamp 66 and carriage case 68 to support the holder. As shown in FIG. 4, one end portion of light source unit 64 is held slidably on shaft 70 parallel with rail 32. Stem 72 protrudes from the same one end of light source unit 64. Roller 74 is attached to the end of this stem 72. Roller 74 is guided by guide rail 76 parallel with shaft 70. A part of timing belt 78 is fixed to the same one end of light source unit 64. This timing belt 78 is applied on driving-side sprocket 80 and driven-side sprocket 82. Driving sprocket 80 is driven by motor 84 provided with a speed reducer. Thus, light source unit 64 is made to reciprocate in the direction of the arrow B synchronously with scanner 14 and along guide 76 and rail shaft 70 at the same speed as scanner 14.

As indicated in FIG. 5, fixed-side members 86 are mounted adjacent to first support joints 50. Fixed-side member 86 and movable-side member 88 constitute single second support joint 90. Second support joints 90 are used to attach original cover 92 to second casing 10. Original cover 92 is made of a synthetic resin and includes original retainer of white-based color with an area sufficient to enclose the whole surface of platen glass 22. This original cover 92 is far simpler in construction and lighter in weight than transmission unit 44. Therefore, second support joints 90 to support original cover 92 described above are made in a simpler construction and with lower strength than first support joints 50. Fixed-side members 86 of second support joints 90 are made of a synthetic resin for example and each have a vertical hole 96. Movable-side members 88 of second support joints each comprise pin 98 insertable into hole 96 of fixed-side member 86 and connecting block 100 that is connected to the rear side of original cover 92 in such a manner as to allow free turning of the original cover.

Pins 98 of movable-side member 88 are inserted from above into holes 96 of fixed-side member 86. Thus, original cover 92 mounted to main body 6 can be opened and closed. FIG. 8 shows original cover 92 mounted to main body 6. Fixed-side members 86 are fixed to second casing 10 each with a plurality of screws 102.

When this image information reading apparatus 2 is used to read information both from originals for reflected light and transmitted light, transmission unit 44 is mounted to main body 6. When an original for reflected light is read, lamp 24 of scanner 14 is lit and scanner 14 is made to reciprocate in the directions of the arrow A in FIG. 3 under the condition that transmission unit 44 is closed on the original S (FIG. 4) placed on platen glass 22. The light radiated from lamp 24 is reflected on the surface of the original and therefore, the reflected light including the image information of the original is injected into photoelectric transducer 26 through optical member 28. Hence, when an original for reflected light is read, lamp 66 of transmission unit 44 is not lit and transmission unit 44 serves as an original retainer.

When an original for transmitted light is read, lamp 66 of transmission unit 40 is lit. Scanner 14 is made to move in the directions of the arrow A just as in reading an original for reflected light. At the same time, light source unit 64 of transmission unit 44 is made to move in the directions of the arrow B synchronously with scanner 14. Thus, the light that is emitted from lamp 66 of transmission unit 44 and is passed through the original transmits through optical member 28 and is input into photoelectric transducer 26. Therefore, transmission unit 44 performs a function to radiate light onto the original and a function to retain the original.

The image information input into photoelectric transducer 26 as described above is digitized by an analog-to-digital converter. The digitized image information is output through cable 16 to external device 4. The selection between an original for reflected light and an original for transmitted light is done by operating the keys provided at operating section 104.

When only originals for reflected light are read by this image information reading apparatus 2, original cover 92 is mounted instead of transmission unit 44. Original cover 92 can be readily mounted to main body by inserting pins 98 of movable-side members 88 of second support joints 90 into holes 96 of fixed-side members 86. In reading of an original for reflected light, lamp 24 of scanner 14 is lit and scanner 14 is made to move under the condition that original copy cover 92 is closed just as transmission unit 44 is closed when transmission unit 44 is used. As a result, the light emitted from lamp 24 is reflected by the surface of the original and the light including the image information of the original is passed through optical member 28 and injected into photoelectric transducer 26.

As described above, for image information reading apparatus 2 according to the embodiment of this invention, it is possible to selectively mount original cover 92 or transmission unit 44 according to applications: one case where this reading apparatus is used for reading original copies for reflected light and the other case where this reading apparatus is used for reading two types of originals for reflected light and transmitted light.

Thus, this image information reading apparatus can comply with two different requests: one for reading only originals for reflected light and the other for reading two types of originals for reflected light and transmitted light. It is also possible to quickly switch this image information reading apparatus from a special-purpose unit for reading only original copies for reflected light to a dual-purpose unit for reading two types of originals for reflected light and transmitted light or vice versa as necessity requires.

When there is only need to read originals for reflected light, it is only necessary to mount simple-structured and light-weight original cover 92 instead of complicated-structured and heavy transmission unit 44. Such an image information reading apparatus can be produced with reduced production cost.

In the above embodiment of this invention, first support joints 50 and second support joints 90 are used. However, in carrying out this invention, it is possible to use common hinges that can be used for both original cover 92 and transmission unit 44, adopt the above-mentioned connecting construction of fixed-side member 86 and movable-side member 88 and thereby make it possible to mount either original cover 92 or transmission unit 44 that is selected.

What is claimed is:

1. An apparatus for selectively reading first image information from an original of a first type and second image information from an original of the second type, the first type original having a characteristic of reflecting light rays and the second type original having a characteristic of transmitting the light rays therethrough, comprising:

a main body having a transparent section onto which one of the first and second type originals is placed;

cover means, detachable from said main body at a connection location on said main body, and having a light ray scattering and diffusing section for covering the transparent section;

first illuminating means, provided in the main body, for illuminating said first type original with first light rays, a part of the first light rays being reflected from the first type original and said scattering and diffusing section through said transparent section;

second illuminating means, provided in said cover means, for passing light through said second type original with second light rays, a part of the second light rays being transmitted through the second type original and said diffusing section; and detecting means, located in the main body and movable along the longitudinal length of said main body, for detecting one of the reflected part of the first light rays at times when said first type original is placed on said transparent section and the transmitted part of said second light rays at times when said second type original is placed on the transparent section to convert the reflected portion of the transmitted part of the light rays into a corresponding one of the first and second image information.

2. An apparatus according to claim 1, wherein said second illuminating means includes a light source disposed in said cover means and said detecting means includes a scanner disposed in said main body, said scanner and said light source being movable simultaneously in the same direction and at the same speed to read an original of the light transmitting type.

3. The image information reading apparatus according to claim 1, further comprising support means for supporting said first lighting means and said reading means and first driving means for moving said supporting means along said original supporting means.

4. The image information reading apparatus according to claim 3, wherein said second lighting means has a lighting section to illuminate an original supported by said original supporting means and second driving means for synchronizing said lighting section with said supporting means and moving said lighting section along said original supporting means.

5. The image information reading apparatus according to claim 1, wherein said mounting means has first mounting means for mounting said second lighting means on said main body and second mounting means for mounting said covering means on said main body.

6. The image information reading apparatus according to claim 5, wherein said first mounting means has first fixed-side member secured to said main body, first movable-side member secured to said second lighting means and first connecting means for connecting the first fixed-side member with the first movable-side member in such a manner as to allow free turning of the movable-side member.

7. The image information reading apparatus according to claim 5, wherein said first mounting means is made of a metal.

8. The image information reading apparatus according to claim 5, wherein said second mounting means comprises a second fixed-side member secured to said main body, said second fixed-side member having a hole, a pin insertable into said hole, a second movable-side member secured to said covering means and second connecting means for connecting said second movable-side member with said pin in such a manner as to allow the pivoting of said covering means away from said main body.

9. The image information reading apparatus according to claim 5, wherein said second mounting means is made of a material lower in strength than said first mounting means.

10. An image information reading apparatus comprising:
- a main body;
- original supporting means for supporting an original of a first type which reflects light and of a second type through which light may pass;
- lighting means for illuminating said second type original supported by said original supporting means;
- reading means, located in the main body, for reading the image information of said first type original by detecting the light reflected by said first type original and for detecting the image information of said second type original passed through said second type original, respectively;
- means for holding said first type original to said original supporting means; and
- means for selectively mounting and detaching said lighting means and said holding means from said main body at a connection location.

11. An apparatus according claim 10, wherein said lighting means includes a light source disposed above said original supporting means and wherein said reading means includes a scanner disposed in said main body, said scanner and said light source being movable simultaneously in the same direction and at the same speed to read an original of the light transmitting type.

12. An image information reading apparatus comprising: a main body including first and second casings, means for pivotably attaching said first and second casings to each other;
- a platen glass mounted on said second casing in a direction facing away from said first casing;
- a scanner located beneath said platen glass and within said second casing, said scanner being movable along the length of said platen glass and having means to illuminate an original of the light reflecting type positioned on said platen glass;
- said main body including a transmission unit located adjacent said second casing and means for pivotably moving said transmission unit toward and away from said second casing;
- a translucent plate provided on the bottom surface of said transmission unit opposite said platen glass;
- a light source located in said transmission unit atop said translucent plate and in alignment with said scanner to illuminate an original of the light transmitting type, said scanner and said light source being movable simultaneously in the same direction and at the same speed to read an original of the light transmitting type; and
- an original cover interchangeable with said transmission unit for reading originals solely of the light reflecting type.

* * * * *